United States Patent Office 3,401,284
Patented Sept. 10, 1968

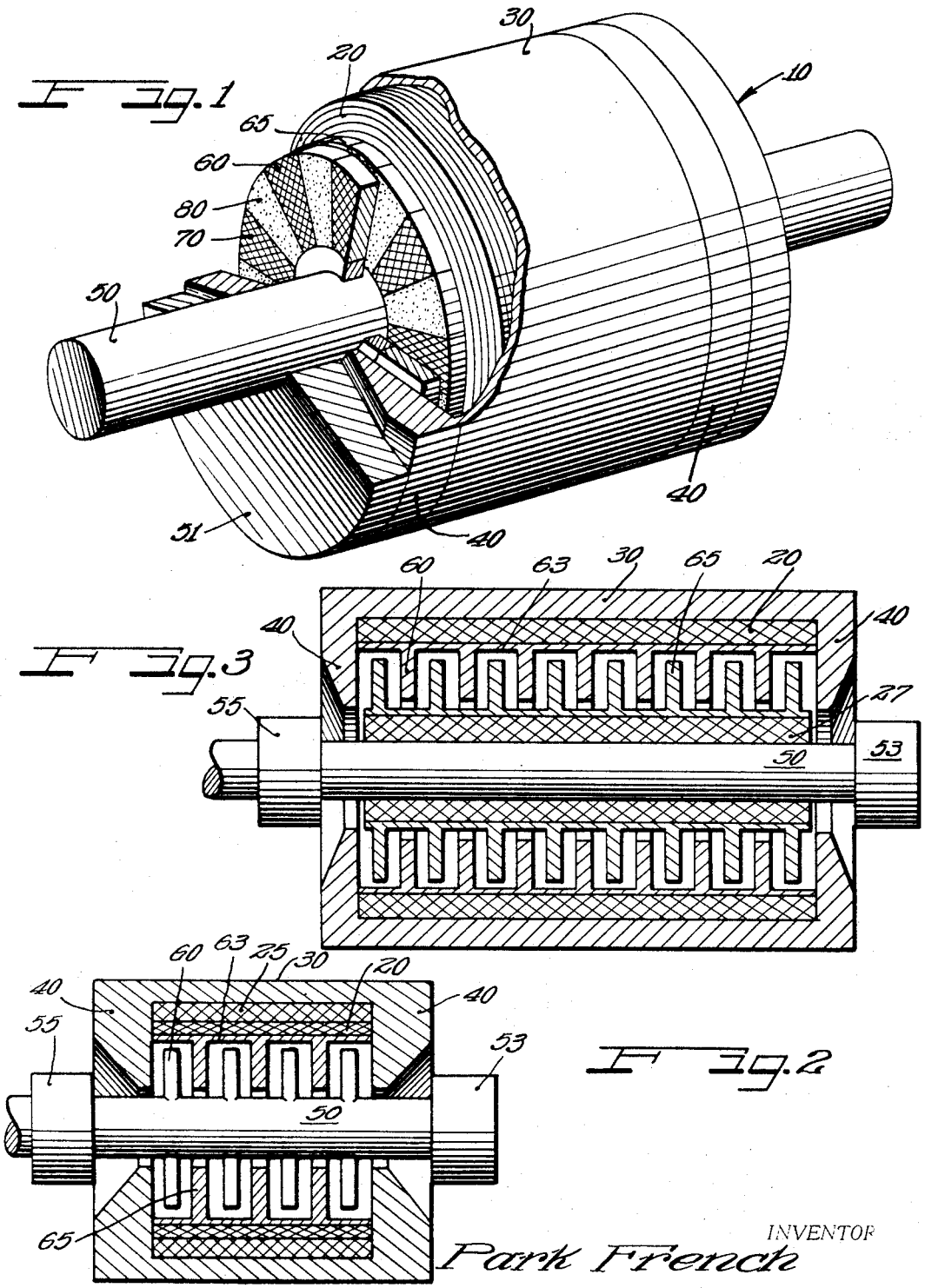

3,401,284
VARIABLE RELUCTANCE DYNAMOELECTRIC MACHINES
Park French, Aurora, Ohio, assignor to TRW Inc., Cleveland, Ohio, a corporation of Ohio
Filed Apr. 25, 1966, Ser. No. 544,782
5 Claims. (Cl. 310—168)

The present invention relates to a new type of dynamoelectric machine, and more particularly to a dynamoelectric reluctance machine having disk-type rotors and stators.

The machines of the present invention are of the disk rotor and stator type in which a shaft carries a plurality of spaced rotor elements which are in interleaved or interdigitated relationship with a plurality of stator disks. While this type of machine, per se, is known, the present invention provides a new and unique manner of controlling the operation of the machine. Also, the construction in accordance with the principles of the invention makes it possible to utilize low permeability magnetic materials in the construction of the machine, and makes it possible to obtain heretofore unobtainable power-to-weight ratios at high efficiencies and relatively low shaft speeds.

One of the objects of the present invention is to provide an improved dynamoelectric machine which is relatively simple to control.

Another object of the invention is to provide an improved dynamoelectric machine which is capable of using low permeability magnetic materials and still provide high efficiency.

Still another object of the invention is to provide an improved dynamoelectric machine of the class described which has a higher power-to-weight ratio than other types of dynamoelectric machines.

A further object of the invention is to provide a dynamoelectric machine of the class described which can be conveniently operated in conjunction with alternating current power lines.

A still further object of the invention is to provide an improved dynamoelectric machine which is capable of using a metallic shaft, such as a nonmagnetic alloy steel, with greatly reduced eddy current losses.

In accordance with the present invention, I provide a dynamoelectric machine which includes a frame, a shaft supported for rotation within the frame, a plurality of rotor elements secured in closely spaced relation along the shaft, a plurality of stator elements extending from the frame in interleaved relation with the stator elements, the rotor elements and stator elements each consisting of disks having alternating areas composed of magnetic and nonmagnetic materials, in combination with one or more coils wound about the combination of rotor and stator elements, and also a coil wound about the shaft having oppositely-directed current flow with respect to the current flow of the first-mentioned coil. Through the arrangement or rotor and stator disks, the machines of the present invention have magnetic paths which vary periodically in reluctance with the angular position of their rotors. The magnetic flux paths link the first coil which provides the necessary magnetomotive forces in the magnetic circuits. By applying pulsed or periodically varying currents to the first coil in synchronism with the reluctance variations, the devices become dynamoelectric machines. If the periods of high current coincide with the periods of decreasing reluctance, the machines act as motors. Conversely, if the high current periods occur during periods of increasing reluctance, the devices act as generators. The second coil provides an opposing dynamic magnetic field which tends to cancel the dynamic magnetic field of the first coil so that eddy current losses in the shaft material tend to be eliminated.

A further description of the present invention will be made in conjunction with the attached drawing which illustrates the principles of the present invention.

In the drawings:

FIGURE 1 is a view in perspective of a dynamoelectric reluctance machine with a portion thereof removed, which embodies the principles of the present invention;

FIGURE 2 is a view partly in elevation and partly in cross-section of the disk element dynamoelectric reluctance machine; and FIGURE 3 is also a cross-sectional elevational view which illustrates a modified form of the present invention.

As shown in the drawings:

In FIGURE 1, a dynamoelectric reluctance machine 10 is shown with a portion thereof removed to more clearly disclose the invention. This figure shows the placing of the major components of the machine, including a centrally disposed shaft 50 mounted for rotation within a frame 51 and which carries an alternating series of rotor disks 65 positioned between axially spaced stator disks 60. A cylindrical flux return section 30 is coaxial with the shaft 50 and forms an outer casing for the dynamoelectric machine. The flux return paths at the ends of the casing are provided by spaced end plates 40 secured to the casing. An axial magnetic field is provided by an excitation coil 20 in circumferential relation to the stator disks 65.

The outside flux return section 30 is composed of a ferromagnetic material having a reasonably high permeability, on the order of at least 50. Both the rotor disks and the stator disks may be identical in magnetic geometry, and consist of alternating equal width sectors 70 of ferromagnetic material, and sectors 80 of nonmagnetic material.

The magnetic sectors are aligned axially with corresponding sectors of all the disks in the rotor set and likewise in the stator set. When the rotor is turned, its magnetic sectors alternately align themselves with the magnetic and nonmagnetic portions of the stator. The variation in reluctance to an axial magnetic field created by coil 20 can be made very large by this action.

The operation of the machine can be understood in terms of forces by the tendency of the magnetic sectors 70 of the rotor to align themselves with those of the stator when an alternating axial magnetic field is applied. If the alternating field is applied during the closing phase of the magnetic circuit, the rotor is pulled into alignment with the stator, after which the magnetic circuit is allowed to coast to the open position under low or zero field conditions. This action delivers a rotational force to the rotor, providing motor action. Similarly, applying the field during the opening phase requires a torque input through the rotor shaft, providing generator action.

The coil 20 provides the necessary axial magnetic field. Thus when current passes through the coil 20 from a suitable source of alternating current (not shown in this drawing), an axial magnetic field is provided, the field encounters a variable reluctance, depending upon the relative position between the rotor disks and the stator disks. The flux return path of the machine extends through the end flux return section 40 and thence through the casing 30.

The shaft 50 is supported for rotation by means of bearings 53 and 55. The main winding 20 is wrapped about the rotor and stator assembly, thereby providing a dynamic magnetic field. The control winding 25 is thence wrapped about the main winding 20 to provide a static magnetic field in an axial direction to interact with the rotor and stator disks. The casing 30 and the end flux return sections 40 are located at the outside of the structure of the machine to provide a return path for the magnetic field of coils 20 and 25.

In previously designed machines of the variable reluctance type, it was common to combine the alternating current and the direct current excitation in the same coil. By separating these currents into separate windings, this device can be conveniently operated from alternating power sources.

The electrical circuit portion of the machine is separated into the two coils 20 and 25, one for alternating current power input or output, and the other for direct current excitation and control, respectively. The electric power source for this machine is not shown in the drawings; however, the control circuits are of the type conventionally used in converting direct current power to alternating current power. Phasing of the circuits can be determined by shaft pickup and timing circuitry of the type shown, for example, in copending application Ser. No. 651,780 of Park French and William J. Skinner, a continuation-in-part of application Ser. No. 384,732, now abandoned.

This type of machine can conveniently operate in conjunction with alternating current power lines, either as a synchronous motor or generator. In such service, only control of the D.C. excitation is required, and no A.C. control circuitry is required.

The shaft 50 is composed preferably of a nonmagnetic material, which provides the machine with desirable characteristics such as a high electrical efficiency. Furthermore, the plate 63 from which the stator elements 50 extend and about which the coil 20 is wound is also composed of a nonmagnetic material to prevent any interference with the magnetic fields of the machine.

Referring now to FIGURE 3, an important aspect of the invention is the addition of a cancelling coil 27, which is wrapped about the shaft 50. The rotor elements 65 are thence fixedly secured to this coil winding 27 so that the entire assembly consisting of the rotor elements 65, the cancelling coil 27, and the shaft 50 rotates between spaced bearings 53 and 55. The main winding 20 carries both alternating current and direct current simultaneously, and the winding 20 may be a single winding or a split winding as shown in FIGURE 2.

The cancelling coil 27 carries only alternating current; however, the ampere-turns for coil 27 is the same as the ampere-turns for the outer coil 20, but the sense of the current in winding 27 is opposite to the sense of the current in coil 20. As a result, the dynamic field produced by the cancelling coil 27 opposes the dynamic field produced by coil 20 in the area of the shaft 50. This cancellation of the alternating current fields allows the use of any type of conductive, nonferromagnetic material for the shaft 50 without incurring eddy current losses in the shaft. This construction is especially suited to large machines, which frequently require high-strength shaft materials. The use of nonmagnetic alloy steels or highly conductive light alloys are permitted by this technique.

It will be noted that the machines described herein fill all the requirements previously noted. The use of the control coils allows for greater control of the reluctance dynamoelectric machines, the provision of a cancelling coil tends to prevent eddy current losses in the shaft, and the other features described herein help to meet the objectives of the present invention.

It should be evident that various modifications can be made to the described embodiments without departing from the scope of the present invention.

I claim as my invention:

1. A dynamoelectric reluctance machine comprising:
    a frame;
    a shaft rotatably mounted on the frame;
    a plurality of rotor elements secured in closely spaced relation along said shaft;
    a plurality of stator elements extending from said frame in interleaved relation with said rotor elements, said elements consisting of disks each having a plurality of magnetic sectors alternating with a plurality of nonmagnetic sectors,
        said magnetic sectors providing a plurality of magnetic paths extending in an axial direction with respect to said shaft;
    first winding means for providing a dynamic magnetic field extending in an axial direction with respect to said shaft; and
    second winding means for providing a static magnetic field extending in an axial direction with respect to said shaft to excite said machine for control thereof.

2. The machine of claim 1 in which said first winding means and said second winding means are disposed coaxially in circumscribing relation to said stator and rotor elements.

3. The machine of claim 1 which includes a third winding about the shaft arranged to minimize eddy current-losses in said shaft.

4. The machine of claim 1 in which one of said winding means carries an A.C. current and the other winding means carries a D.C. current.

5. The machine of claim 1 in which one of said winding means carries both A.C. and D.C. currents and the other of said winding means carries an alternating current.

References Cited
UNITED STATES PATENTS

| | | | |
|---|---|---|---|
| 579,012 | 3/1897 | Scheeffer | 310—168 |
| 2,438,629 | 3/1948 | Anderson | 310—268 |
| 3,284,651 | 11/1966 | Wesolowski | 310—168 |

MILTON O. HIRSHFIELD, *Primary Examiner.*

L. L. SMITH, *Assistant Examiner.*